United States Patent [19]
Kiel

[11] 3,799,266
[45] Mar. 26, 1974

[54] FRACTURING METHOD USING ACID EXTERNAL EMULSIONS

[75] Inventor: Othar M. Kiel, Homeworth, Ohio

[73] Assignee: Esso Production Research Company, Houston, Tex.

[22] Filed: Aug. 18, 1972

[21] Appl. No.: 281,694

Related U.S. Application Data

[63] Continuation-in-part of Ser. No. 263,081, June 15, 1972, Pat. No. 3,760,881, which is a continuation-in-part of Ser. No. 146,349, May 24, 1971, Pat. No. 3,710,865, which is a continuation-in-part of Ser. No. 76,887, Sept. 30, 1970, abandoned.

[52] U.S. Cl............. 166/308, 166/307, 252/8.55 C
[51] Int. Cl....................... E21b 43/26, E21b 43/27
[58] Field of Search........ 166/305 R, 307, 308, 271, 166/281, 282; 252/8.55 R, 8.55 C

[56] References Cited
UNITED STATES PATENTS

| | | | |
|---|---|---|---|
| 3,353,603 | 11/1967 | Knight | 166/307 |
| 3,681,240 | 8/1972 | Fast et al. | 166/307 X |
| 3,500,929 | 3/1970 | Eilers et al. | 252/8.55 C |
| 2,793,998 | 5/1957 | Brainerd, Jr. et al. | 252/8.55 C |
| 2,876,839 | 3/1959 | Fast et al. | 166/283 |
| 3,552,494 | 1/1971 | Kiel | 166/308 |
| 2,802,531 | 8/1957 | Cardwell et al. | 166/307 X |
| 3,160,207 | 12/1964 | McEver | 166/307 |

*Primary Examiner*—Stephen J. Novosad
*Attorney, Agent, or Firm*—Robert L. Graham

[57] ABSTRACT

A subterranean carbonate formation is treated by injecting into the formation an emulsion comprising an aqueous acid solution as the external phase and a hydrocarbon oil as the internal phase. The external acid phase constitutes at least 20 volume percent of the emulsion and preferably between 20 and 50 volume percent of the emulsion.

17 Claims, 1 Drawing Figure

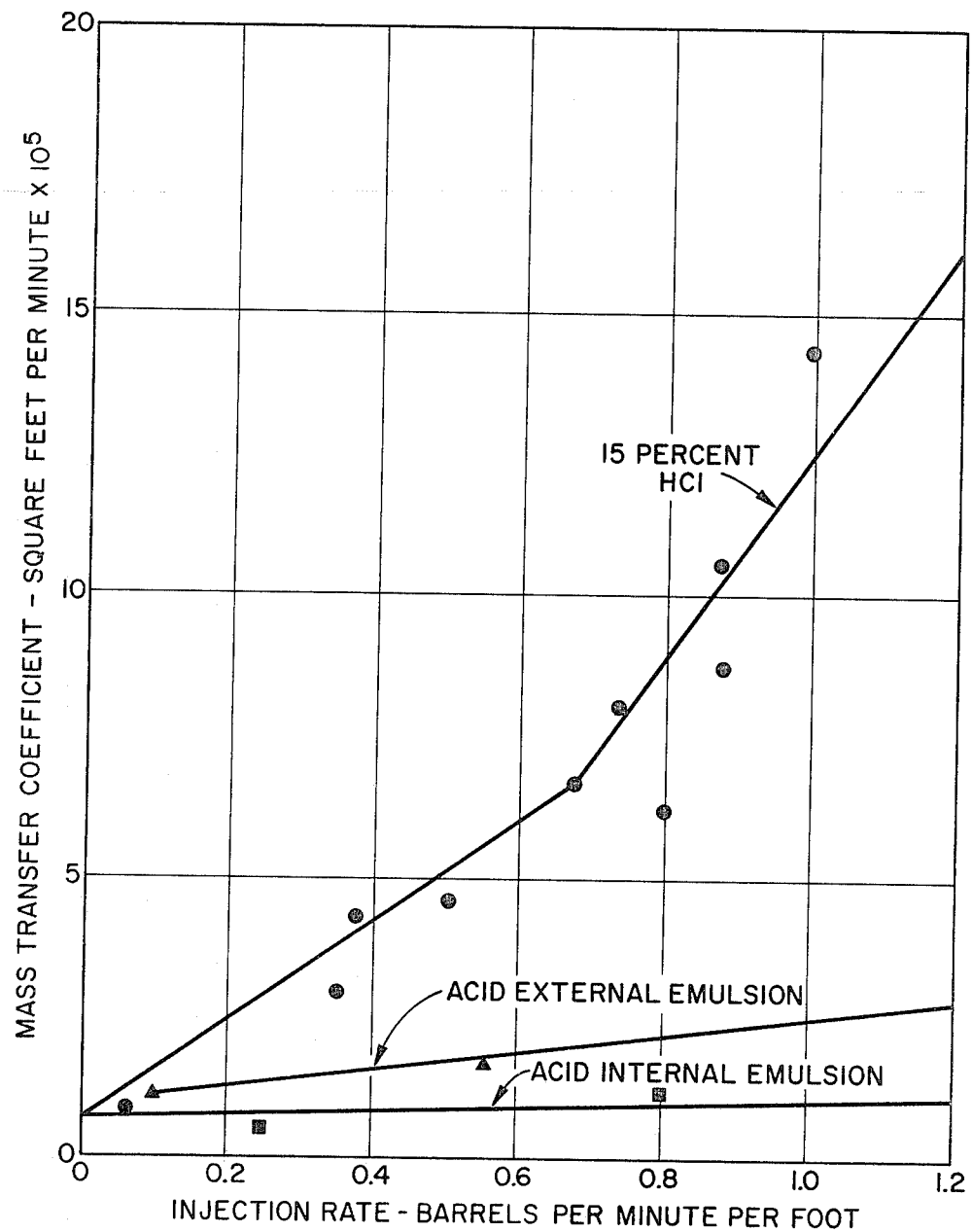

FRACTURING METHOD USING ACID EXTERNAL EMULSIONS

CROSS REFERENCE TO RELATED APPLICATIONS

This application is a continuation-in-part of Application Ser. No. 263,081, filed June 15, 1972, now U.S. Pat. No. 3,760,881, which is a continuation-in-part of Application Ser. No. 146,349, filed May 24, 1971, now U. S. Pat. No. 3,710,865, which is a continuation-in-part of Application Ser. No. 76,887, filed Sept. 30, 1970, now abandoned.

BACKGROUND OF THE INVENTION

1. Field of the Invention

This invention relates to the acid fracturing of subterranean carbonate formations surrounding oil wells, gas wells, and similar boreholes.

2. Description of the Prior Art

Acid fracturing is a widely used technique for stimulating the production of subterranean carbonate formations surrounding oil wells, gas wells, and similar boreholes. This technique normally involves the injection of an aqueous acid solution into the wellbore at a rate and pressure sufficiently high to fracture the surrounding formation. Stimulation is achieved by the acid etching the fracture walls, thereby providing highly conductive channels when the fracture closes. Tests have shown that the degree of stimulation afforded by the acid fracturing technique is strongly dependent upon the extent of acid penetration in the fracture. One method proposed for providing deep acid penetration involves the use of an emulsion comprising an oil external phase and an acid internal phase. The external oil phase apparently shields the acid from the formation materials and thereby permits unreacted acid to penetrate deeply into the formation. A major problem associated with the oil external, acid internal emulsions, however, has been that of pumpability. The relatively high viscosity of the external oil phase restricts the rate at which the emulsion can be pumped through the wellbore and into the formation with the result that long and wide fractures are normally not obtained. Other efforts to increase acid penetration using retarded acids and gelled acids have been only partially successful.

SUMMARY OF THE INVENTION

The present invention provides an improved acid fracturing process that alleviates many of the difficulties associated with prior art techniques. The method employs an acid external emulsion which is capable of delivering unreacted acid long distances from the wellbore into the formation. The acid external emulsion comprises an aqueous solution containing at least 3 weight percent of a mineral or organic acid as the external phase, and a hydrocarbon oil as the internal phase. The acid phase constitutes at least about 20 volume percent, and preferably between about 20 and about 50 volume percent of the emulsion. In order to impart desired properties to the emulsion, the acid phase preferably contains an acid thickening agent and the internal oil phase constitutes between about 50 and about 80 volume percent of the emulsion.

In a preferred embodiment of the invention, the acid external emulsion is injected into a subterranean carbonate formation at rates and pressures to initiate and propagate a fracture therein. Tests have shown that the emulsion is capable of generating long and wide fractures and delivering unreacted acids long distances into the fracture.

The acid external emulsion may also be used in combination with other fluids. One procedure involves injecting first the acid external emulsion into the formation to initiate and generate the fracture and thereafter injecting plain acid into the fracture. Because of the high viscosity ratio of the acid external emulsion and plain acid, the latter fingers through the former providing concentrated acid channels which react with the fracture walls. Another procedure involves the use of a separate viscous fluid for initiating and generating the fracture, and following this fluid with a less viscous acid external emulsion. The formulation of the viscous fluid and the emulsion are controlled to provide a high viscosity ratio between the two fluids. The high viscosity ratio permits the emulsion to finger through the viscous fluid forming long, thin channels which react with the fracture walls. The localized reaction of the acid on the fracture walls produces highly conductive zones within the formation and thereby stimulates production.

Although the mechanisms responsible for the unusual acid penetration obtained in accordance with the present invention are not fully understood, it is believed that the acid external emulsion retards the rate at which acid is transferred to the reactive sites within the formation. Laboratory tests have shown that acid penetration is governed primarily by the rate of acid transport to the fracture wall and not by the reaction rate of the acid. The low rate of acid transport provided by the acid external emulsion is believed to be due to the relatively high viscosity and low fluid loss characteristics of the emulsion.

Other important variables that affect acid penetration are the rate at which the acid is injected into the formation and the width of the fracture created. Tests have shown that increasing either of these variables will increase acid penetration. The acid external emulsion, because of its non-Newtonian flow behavior, can be injected at low tubular friction permitting the attainment of high injection rates, which as noted above, favors deep acid penetration. It should also be noted that the acid external emulsion possesses properties which permit the creation of wide fractures. This factor also contributes to deep acid penetration. Although other mechanisms may also be involved, results of laboratory anf field tests strongly suggest that these mechanisms contribute significantly.

Although any organic or mineral acid presently used in formation acidizing may be employed as the external phase, it is preferred that an HCl solution be used. The concentration of the aqueous HCl solution may be between about 3 and 37 volume percent with concentrations between 15 and 28 volume percent being preferred. The acid thickening agent employed to increase the viscosity of the aqueous acid solution may be any presently used for that purpose. Suitable acid thickening agents include guar gum and polyacrylamide. In order to promote emulsification, the system will also include a surface-active agent capable of forming oil-in-acid emulsions.

BRIEF DESCRIPTION OF THE DRAWING

The drawing is a plot of effective mixing coefficient versus injection rate per foot of formation for various fluids used in acid fracturing operations.

DESCRIPTION OF THE PREFERRED EMBODIMENTS

The emulsion employed in the method of the present invention comprises an aqueous acid solution as the external phase, a hydrocarbon oil as the internal phase, and an emulsifying agent capable of forming an oil-in-acid emulsion. In order to provide sufficient amount of acid to react with the formation, the emulsion should contain at least 20 volume percent of the aqueous acid solution. The emulsion may contain as much as 80 volume percent of the aqueous acid solution but as pointed out below, normally will contain no more than 50 volume percent of the acid solution.

The acid external emulsion has properties particularly suited for acid fracturing treatments. These properties relate to viscosity, fluid loss characteristic, and pumpability.

The viscosity of the emulsion is controlled by varying the concentration of the internal oil phase. In certain applications, as for example when the emulsion is used to initiate the fracture, it may be desirable to use an acid thickening agent to further increase the viscosity of the emulsion. In such applications, the concentration of the thickening agent should be sufficient to impart an apparent viscosity to the acid solution of between about 10 centipoises and about 200 centipoises at 70°F and a shear rate of 511 reciprocal seconds. The preferred concentration of the internal oil phase in the emulsion is between about 50 and about 80 volume percent, although lower concentrations may be used if a low viscosity emulsion is desired. The concentrations of the thickening agent and hydrocarbon oil should be controlled to provide the emulsion with an apparent viscosity of at least about 100 centipoises, preferably between about 100 and about 400 centipoises, at 70°F and a shear rate of about 511 reciprocal seconds. When used in combination with a separate viscous fluid preceding the emulsion, the emulsion may be formulated to have a much lower apparent viscosity.

The fluid loss property of the emulsion is particularly important in acid fracturing mainly because of its effect on fracture width. A fluid exhibiting low fluid loss is capable of generating a wider fracture than one exhibiting high fluid loss. Laboratory tests have shown that wide fractures favor deep acid penetration. The acid external emulsion of the present invention inherently exhibits low fluid loss because of its relatively high viscosity and because of the dispersed oil particles. Commercial fluid loss additives may also be added to the emulsion to further improve its fluid loss characteristic.

A particularly attractive feature of the emulsion employed in the present invention is its pumpability. The shear thinning flow behavior of the emulsion permits it to be pumped at relatively low friction loss in the tubing. Moreover, many of the acid thickening agents behave as friction reducers and further improve the pumpability of the emulsion. Tests have shown that an acid external emulsion containing an acid thickening agent in the acid phase can be pumped at a friction loss substantially lower than that using plain water. This high pumpability enables the fluid to be injected at high rates into the formation and produces wide fractures.

As mentioned previously, any organic or mineral acid presently used in the acid treatment of subterranean formations may be employed as the acid phase. The acid should be present in the aqueous solution in a concentration of at least 3 weight percent. The organic acids include acetic, formic, propionic, and the like. Suitable mineral acids include hydrochloric, hydrofluoric, and a mixture of these acids. The preferred acid, however, is a 15 to 28 percent aqueous solution of hydrochloric acid.

The hydrocarbon oil can be crude oil, a gas condensate, or a virgin or refined petroleum fraction such as kerosene, gasoline, diesel oil, gas oil, liquefied petroleum gases, or the like. Crude oil or gas condensate produced from the formation to be treated are preferred because of their availability and because of their compatibility with the formation. Emulsions containing crude oil or gas condensate as the internal phase provide for rapid well cleanup following the treatment. If crude oil or gas condensate are not available, other hydrocarbon oils may be employed. These oils should have a viscosity of no more than about 10 centipoises at 70°F and preferably below 5 centipoises at 70°F.

The selection of the most efficient emulsifying agent and its concentration in the emulsion will depend upon several factors, including the composition of the oil and type of acid employed in the emulsion, the temperature of the formation to be treated, the type of blending equipment available, and the compositions of the additives to be employed in the emulsion. The most efficient emulsifying agent or blends thereof for a particular system may require a selection by a trial-and-error process. Normally, however, the emulsifying agent should have a hydrophile-lipophile balance (HLB) number between about 8 and 18. Particularly useful emulsifying agents employed in systems using HCl solutions include alkyl and alkylaryl sulfonates, quaternary ammonium compounds such as long chain quaternary ammonium chloride, and nonionic emulsifying agents. The concentration of the emulsifying agent will normally be between about 0.1 and 3.0 weight percent based on the weight of the aqueous acid solution.

Thickening agents useable in the acid solution include synthetic or naturally occurring polymers, or mixtures of these. The preferred synthetic polymer is polyacrylamide and the preferred naturally occurring polymer is guar gum. Other thickeners capable of thickening acid solutions may also be employed. The concentration of the thickening in the acid solution will normally be between 0.1 and 1.0 weight percent based on the weight of the acid solution.

The procedures employed to form the acid emulsion will depend upon the type of operation contemplated. In one procedure, the emulsion may be prepared by first dissolving the polymer and the emulsifying agent in the acid solution to form a thickened acid solution and then commingling this solution with oil. Preferably, the thickened acid solution is flowed through a conduit and the oil is blended into this stream at a plurality of points to increase the concentration of the internal phase to the desired level. Experience has shown that the emulsification of the hydrocarbon oil in the acid solution occurs very rapidly. This mixture then may be passed through blending equipment where additives such as fluid loss agents may be blended into the stream. The acid emulsion may also contain a corrosion inhibitor and other additives which may be added to the system prior to or after emulsification.

An alternate procedure involves adding the emulsifying agent to the acid, blending in the internal hydrocarbon oil as described previously to form the emulsion, and then introducing the polymer and fluid loss additive into the emulsion as it is pumped through blending equipment and into the well. The latter procedure avoids the risk of the polymer being prematurely decomposed by the acid before the emulsion reaches the formation.

As mentioned previously, the acid external emulsion may be used to initiate and propagate the fracture or it may be used in combination with a separate viscous fluid. When used as the fluid for initiating and propagating the fracture, the acid emulsion may be used alone or it may be followed with plain acid such as a concentrated HCl solution. The concentrated HCl solution is preferably 20 to 37 percent HCl and may contain additives including thickening agents, friction reducers, corrosion inhibitors, fluid loss additives, and demulsifiers. The concentrated acid solution normally will have a much lower viscosity than that of the emulsion. The high viscosity ratio of the emulsion to acid solution causes the acid solution to channel or finger through the emulsion in the fracture.

In the embodiment wherein the acid emulsion is injected into a fracture that has been initiated and propagaged with a separate viscous fluid, the acid emulsion will be formulated to have a viscosity substantially lower than that of the separate viscous fluid. A particularly useful fluid that may be used to generate the fracture is an oil-in-water emulsion wherein the external water phase contains a water soluble polymeric thickening agent and the internal oil phase constitutes more than 50 but no more than 80 volume percent of the emulsion. The concentration of the polymer in the water phase and the concentration of the internal oil phase are controlled so that the emulsion has an apparent viscosity of between about 100 and 400 centipoises at 70°F and a shear rate of 511 reciprocal seconds. Following the injection of this viscous fluid, the acid external emulsion is pumped into the wellbore at fracturing rates. The concentration of the internal oil phase and the concentration of the acid thickening agent will be controlled so that the viscosity of the acid emulsion is substantially less than that of the viscous fluid previously pumped into the formation. Normally the viscosity ratio of the viscous fluid and the acid external emulsion will be at least 5:1 and preferably greater than 10:1. The acid emulsion because of its reduced viscosity will finger or channel through the viscous pad fluid so that little reaction of the acid with the carbonate formation takes place until the acid reaches the outer ends of the fracture. The retarded activity of the acid external emulsion due to its viscosity and low fluid loss characteristic also contributes to the deep penetration of unspent acid into the fracture.

Laboratory tests were conducted to compare the performance of a 15 percent HCl solution, an acid internal emulsion, and an acid external emulsion under simulated reservoir conditions. The experiments were designed to allow for the measurement of acid reaction rate during flow between parallel walls of a limestone core. The parallel surfaces of the core were oriented to represent flow along a vertical fracture to allow gravity forces to properly influence acid mixing. The temperature and pressure of the test equipment were controlled to simulate reservoir conditions.

As noted previously, the distance which reactive acid moves along a fracture is governed primarily by the mass transfer rate of the acid to the fracture wall. The mass transfer rate of the acid may be represented by the mass transfer coefficient calculated by the following equation.

$$D = [3.46 \, Wi \, (1 - C/C_o)^{3/2i} Lh \,] \times 10^{-5}$$

where $D$ is the effective mass transfer coefficient for acid, square feet per minute; $W$ is the fracture width, inches; $i$ is the injection rate, cubic centimeters per second; $C$ is the acid concentration; $C_o$ is the initial acid concentration; $L$ is the length of the fracture, feet; and $h$ is the height of the fracture, feet.

Experimental procedure involved determining the extent of reaction of the acid passing through a split limestone core at a variable rate. The test equipment consisted of a rectangular cell constructed such that core halves could be mounted a fixed distance apart. Entrance and exit regions were provided to insure that the fluid was in the fully developed flow pattern prior to entering the reaction section and to eliminate exit effects. Rough wall limestone cores were prepared by longitudinally splitting a 3-inch diameter core. The outer surfaces of the core halves were machined and coated with an epoxy resin, and placed in the cell. The parallel surfaces of the core halves were placed about ¼ to ½ inch apart. Each of the acid fluids tested was flowed through the cell which was maintained at a temperature of between about 150°F and about 180°F. The cores for the HCl solution and the acid internal emulsion were 12 inches long and presented exposed parallel surfaces 2 inches in height. The cores used to test the acid external emulsion were 5 feet long and presented exposed parallel surfaces 2 inches in height.

Prior to commencing each test, water was flowed through the cell to saturate the cores. The test was initiated by switching from water to the test fluid. Samples of acid effluent from the cell were collected and the extent of reaction determined by standard phenolphthalin acid-base titration. These data were then used to calculate the mass transfer coefficients for each of the fluids at various throughput rates.

The acid internal emulsion used in the experiment was prepared by emulsifying a 28 percent HCl solution in 2 centipoise diesel oil containing an emulsifying agent (dodecylbenzenesulfonic acid). The volume concentrations of the acid phase and oil phase were 75 and 25 percent, respectively.

The acid external emulsion was prepared by dispersing guar gum in a 28 percent HCl solution containing an emulsifying agent (a long chain quaternary ammonium chloride). The concentration of the guar gum was about 0.57 weight percent based on the weight of the acid solution. Two centipoise diesel oil was then blended into the thickened acid solution to provide an emulsion comprising about 33 volume percent of an external acid phase and about 67 volume percent of an internal oil phase. The plot of the DRAWING shows that the acid emulsions have mass transfer coefficients substantially lower than that of plain HCl. Reactive acid contained in these emulsions thus would be expected to penetrate more deeply into a fracture than the plain HCl solution. Although the data suggests that the two acid emulsions will provide approximately the same degree of acid penetration, the acid external emulsion has other properties which make it superior to the acid internal emulsion. The acid external emulsion can be pumped at a much higher rate than the acid internal emulsion and thereby generate wider fractures and provide for higher acid flow rate in the fracture. As noted previously, both of these conditions favor deep acid penetration.

The following field test illustrates the effectiveness of the present invention. A pumping well, completed in a dolomite formation with perforations in the interval between 6,722 and 7,075 feet, was capable of producing only one barrel of oil and 47 barrels of water per day. An acid fracturing treatment was designed to use about 18,000 gallons of an acid external emulsion and about 18,000 gallons of a concentrated acid solution. Because of the length of the perforated interval, it was decided to perform the treatment in three stages using a diverting agent between the stages. The method was performed using four 500-barrel tanks, an oil field blender, and high pressure fracturing pumps. About 6,000 gallons of 15 percent HCl solution was placed in one tank, about 18,000 gallons of 20 percent HCl solution in a second tank, about 12,000 gallons of lease crude in a third tank, and lease brine in a fourth tank. The HCl solutions contained a commercial corrosion inhibitor. Fifty-five gallons of a long chain quaternary ammonium chloride marketed by Enjay Chemical Company as a cationic emulsifier under the tradename "Corexit 8596" was added to the 15 percent HCl. The acid solution containing the emulsifier was then mixed with the lease crude in a volumetric ratio of 1:2 forming an acid external emulsion. Emulsification was achieved by passing the 15 percent HCl solution through a blender, blending the oil into the HCl solution, and returning the mixture to the tank that contained the 15 percent HCl solution. The mixture of oil and acid solution was circulated through the blender until the oil was uniformly dispersed in the acid solution. A demulsifier marketed by Enjay Chemical Company under the tradename "Corexit 7652" was added to the 20 percent HCl solution and to the lease water. The concentration of the demulsifier was about 1 gallon per 1,000 gallons of each of these fluids. The demulsifier was used to prevent formation fluids from emulsifying with injected fluids.

Following preparation of the fluids, pumping operations were commenced. The emulsion was pumped through the blender where guar gum and a commercial fluid loss additive were added in a concentration of about 20 pounds each per 1,000 gallons of emulsion. This fluid containing the additives was then pumped into the well until about 6,000 gllons of the emulsion had been injected. The pressure initially increased and then fell off indicating that the formation had been broken down and that the fracture had been initiated. This initial volume of acid emulsion was followed immediately with a 20 percent HCl solution. Guar gum was added to the 20 percent HCl solution to provide a concentration of about 50 pounds per 1,000 gallons. The 20 percent HCl solution was then followed with 2,000 gallons of lease brine. A commercial diverting agent was employed in the trailing portion of the lease brine to seal the interval that had been fractured and divert fluid to other less permeable intervals. The second and third stages were performed using the fluid compositions and volumes employed in the first stage. The pumping schedule for the entire treatment was as follows:

| | Volume (gallons) | Additive | Additive Concentration (per 1000 gallon of fluid) |
|---|---|---|---|
| First Stage | | | |
| Acid external emulsion | 6000 | Guar gum | 20 pounds |
| | | Fluid loss additive | 20 pounds |
| 20 percent HCl solution | 6000 | Guar gum | 50 pounds |
| | | Demulsifying agent | 1 gallon |
| Lease brine | 2000 | Demulsifying agent | 1 gallon |
| | | Diverting agent | 500 pounds (total) |
| Second Stage | | | |
| Acid external emulsion | 6000 | Guar gum | 20 pounds |
| | | Fluid loss additive | 20 pounds |
| 20 percent HCl solution | 6000 | Guar gum | 50 pounds |
| | | Demulsifying agent | 1 gallon |
| Lease brine | 2000 | Demulsifying agent | 1 gallon |
| | | Diverting agent | 500 pounds (total) |
| Third Stage | | | |
| Acid external emulsion | 6000 | Guar gum | 20 pounds |
| | | Fluid loss additive | 20 pounds |
| 20 percent HCl solution | 6000 | Guar gum | 50 pounds |
| | | Demulsifying agent | 1 gallon |
| Lease brine | 2000 | Demulsifying agent | 1 gallon |

The injection rate of the emulsion fracturing fluid was between about 10 and 16 barrels per minute and the wellhead pressure ranged between about 4,800 and about 5,600 psi for the first stage and between about 4,900 and about 5,900 psi for the second and third stages.

The friction loss of the emulsion flowing through the 2⅞ inch tubing was estimated to be substantially less than plain water flowing at the same rate.

Following the treatment, the well was shut in overnight. When the well was placed on production, it initially flowed at a rate of 361 barrels of oil per day and 360 barrels of water per day. The six-day production average following the treatment was 332 barrels of oil per day and 260 barrels of water per day.

Although several factors may be responsible for the remarkable results obtained in the treatment described above, it is believed that the deep acid penetration afforded by the acid external emulsion was a major contributing factor.

I claim:

1. A method for the acid treatment of a subterranean formation containing carbonate constituents which comprises contacting said formation with an emulsion comprising a hydrocarbon oil as the internal phase and an aqueous acid solution containing at least 3 weight percent of an acid as the external phase, said aqueous acid solution constituting from about 20 to about 50 volume percent of said emulsion.

2. A method as defined in claim 1 wherein said acid is HCl.

3. A method as defined in claim 2 wherein said aqueous solution contains from 15 weight percent to 37 weight percent HCl.

4. A method as defined in claim 1 wherein said aqueous acid solution contains a sufficient amount of a polymeric thickening agent to impart an apparent viscosity to said aqueous solution of at least 10 centipoises at 70°F and a shear rate of about 511 reciprocal seconds.

5. A method as defined in claim 4 wherein the concentration of said hydrocarbon oil and said polymeric thickening agent in said emulsion is sufficient to provide the emulsion with an apparent viscosity of at least 100 centipoises at 70°F and a shear rate of about 511 reciprocal seconds.

6. A method as defined in claim 4 wherein said polmeric thickening agent is guar gum.

7. A method as defined in claim 4 wherein said polymeric thickening agent is a polyacrylamide.

8. A method as defined in claim 1 wherein said aqueous acid solution is injected in said formation at a rate and pressure sufficient to open a fracture in said formation.

9. A method of acid fracturing a subterranean formation containing carbonate constituents which comprises injecting into said formation at a rate and pressure sufficient to open a fracture therein a first liquid, and thereafter injecting into said fracture an emulsion comprising a hydrocarbon oil as the internal phase and an aqueous solution containing at least 3 weight percent of an acid as the external phase, said aqueous acid solution constituting at least 20 volume percent of said emulsion and said emulsion having an apparent viscosity substantially less than the viscosity of said first liquid.

10. A method as defined in claim 9 wherein said aqueous acid solution contains a sufficient amount of a polymeric thickening agent to impart an apparent viscosity of at least 10 centipoises at 70°F and a shear rate of 511 reciprocal seconds to said aqueous acid solution.

11. A method as defined in claim 9 wherein the viscosity of said first liquid is at least five times the viscosity of said emulsion.

12. A method of acid fracturing a subterranean formation surrounding a wellbore which comprises injecting into said formation at a rate and pressure sufficient to open a fracture in said formation an emulsion comprising an aqueous solution containing at least 3 weight percent of an acid as the external phase and a hydrocarbon oil as the internal phase, said aqueous solution comprising at least 20 volume percent of said emulsion; and thereafter injecting a concentrated acid solution into said fracture.

13. A method as defined in claim 12 wherein the concentrated acid solution comprises from 20 to 37 weight percent HCl.

14. A method as defined in claim 12 wherein said aqueous acid solution constitutes between about 20 and about 50 volume percent of said emulsion.

15. A method as defined in claim 12 wherein said aqueous acid solution contains sufficient amount of an acid thickening agent to impart an apparent viscosity of at least 10 centipoises at 70°F and a shear rate of 511 reciprocal seconds to said aqueous acid solution.

16. A method of acid fracturing a subterranean formation containing carbonate constituents which comprises injecting into said formation at a pressure and rate sufficient to open a fracture therein an emulsion comprising from about 20 to about 50 volume percent of an aqueous liquid containing at least 3 weight percent of an acid as the external phase, from about 50 to about 80 volume percent of a hydrocarbon oil as the internal phase, and an effective amount of a surface-active agent to stabilize the emulsion.

17. A method as defined in claim 16 wherein said emulsion further includes an acid thickening agent for imparting viscosity to the external phase of the emulsion.

* * * * *

Disclaimer 3,799,266.—*Othar M. Kiel*, Homeworth, Ohio. FRACTURING METHOD USING ACID EXTERNAL EMULSIONS. Patent dated Mar. 26, 1974. Disclaimer filed Dec. 15, 1975, by the assignee, *Exxon Production Research Company*.

Hereby enters this disclaimer to claims 1, 2, 3, 4, 5, 6 and 7 of said patent.

[*Official Gazette March 23, 1976.*]